US008336675B2

(12) United States Patent
Ach et al.

(10) Patent No.: US 8,336,675 B2
(45) Date of Patent: Dec. 25, 2012

(54) ELEVATOR WITH FLAT BELT AS SUSPENSION MEANS

(75) Inventors: Ernst Ach, Ebikon (CH); Martin Rogger, Rotkreuz (DE)

(73) Assignee: Inventio AG, Hergiswil (CH)

( * ) Notice: Subject to any disclaimer, the term of this patent is extended or adjusted under 35 U.S.C. 154(b) by 335 days.

(21) Appl. No.: 11/665,938

(22) PCT Filed: Oct. 14, 2005
(Under 37 CFR 1.47)

(86) PCT No.: PCT/CH2005/000603
§ 371 (c)(1),
(2), (4) Date: Jul. 18, 2007

(87) PCT Pub. No.: WO2006/042427
PCT Pub. Date: Apr. 27, 2006

(65) Prior Publication Data

US 2008/0087500 A1 Apr. 17, 2008

(30) Foreign Application Priority Data

Oct. 18, 2004 (EP) .................................... 04105126

(51) Int. Cl.

| | |
|---|---|
| ***B66B 11/08*** | (2006.01) |
| ***B66B 11/04*** | (2006.01) |
| ***F16G 5/00*** | (2006.01) |

(52) U.S. Cl. ......... 187/255; 474/238; 474/252; 187/251

(58) Field of Classification Search .................. 187/251, 187/266, 255, 250; 474/238, 260, 251, 252; 198/844.1, 626.1
See application file for complete search history.

(56) References Cited

U.S. PATENT DOCUMENTS

| | | | | |
|---|---|---|---|---|
| 2,472,513 | A * | 6/1949 | Bergquist | 474/167 |
| 3,643,518 | A * | 2/1972 | Semin et al. | 474/139 |
| 4,798,566 | A * | 1/1989 | Sedlacek | 474/238 |
| 4,944,717 | A * | 7/1990 | Georget | 474/238 |
| 5,284,456 | A * | 2/1994 | Connell et al. | 474/91 |
| 6,401,871 | B2 | 6/2002 | Baranda et al. | |
| 2002/0183153 | A1* | 12/2002 | Patterson et al. | 474/263 |
| 2003/0017900 | A1* | 1/2003 | Kopang | 474/260 |
| 2003/0032514 | A1* | 2/2003 | Edwards et al. | 474/263 |
| 2007/0060430 | A1* | 3/2007 | Alden et al. | 474/237 |

FOREIGN PATENT DOCUMENTS

| | | |
|---|---|---|
| AU | 2468771 | 7/1972 |
| EP | 0750010 | 12/1996 |
| EP | 1396458 | 3/2004 |

* cited by examiner

*Primary Examiner* — Michael R Mansen
*Assistant Examiner* — Stefan Kruer
(74) *Attorney, Agent, or Firm* — Wolff & Samson, PC

(57) ABSTRACT

An elevator with belt-sheaves and at least one flat belt to suspend and move an elevator car. For the purpose of guiding the flat belt on the belt-sheaves, the belt has at least one guide groove in which at least one guide rib projecting from the sheave running surface of the belt-sheave engages.

14 Claims, 4 Drawing Sheets

ELEVATOR WITH FLAT BELT AS SUSPENSION MEANS

This is a U.S. national stage of application No. PCT/CH2005/000603, filed on Oct. 14, 2005. Priority is claimed on that application and on the following application:

Country: Europe, Application No.: EP 04105126.9 Filed: Oct. 18, 2004

BACKGROUND OF THE INVENTION

The invention relates to an elevator in which, for the purpose of suspending and driving an elevator car, flat belts are used as suspension means. The invention relates to the problem of guiding flat belts on belt-sheaves, i.e. on traction and deflection sheaves of an elevator installation.

From U.S. Pat. No. 6,401,871 a suspension means for an elevator is known that has the form of a flat belt with rectangular cross section, and whose belt body consists of an elastic material and several embedded tensile cords parallel to its longitudinal axis. For the purpose of guiding the flat belt on the belt-sheaves used as traction or deflection sheaves, two different means are proposed. According to a first proposal, the belt running surfaces of the flat belt, as well as the running surfaces of the sheave, are provided with complementary contours. These contours ensure guidance of the flat belt on the belt-sheave. According to a second proposal, the flat belts are guided by disk-shaped guide elements that project beyond the sheave running surfaces at the edge of a belt-sheave or between several sheave running surfaces.

The methods proposed in U.S. Pat. No. 6,401,871 for guiding the flat belts have significant disadvantages.

As described in U.S. Pat. No. 6,401,871, in the first proposal of a belt guide with contoured running surfaces the tractive capacity between a traction sheave and the flat belt is also increased. This solution has the disadvantage that as a result of the increased tractive capacity, there is a safety risk that in a situation in which the elevator car or the counterweight rests on its lower travel limits, the tractive capacity between the traction sheave and the flat belt remains so high that the elevator car or the counterweight can be caused to move further in upward direction.

Guidance of the flat belt by means of disk-shaped guide elements has also proved disadvantageous. If the edge of the flat belt is pressed with a certain contact pressure against these guide elements that rotate with the belt-sheave, the flat belt is laterally raised by the latter in such manner that the side surface of the belt climbs radially on the guide element and can provide practically no further resistance against movement of the flat belt. Consequently, flat belts can fall off the belt-sheave or be prematurely destroyed.

SUMMARY OF THE INVENTION

The objective of the present invention is to propose an elevator with flat belts as suspension means that does not have the said disadvantages, i.e. to propose an elevator in which the flat belts can be guided on the traction and deflection sheaves of the elevator installation securely and with little wear, without elaborate and costly guide means as, for example, crowned or double-conical sheave running surfaces, being necessary.

According to the invention, this objective is fulfilled by an elevator that has at least one flat belt for suspension and movement of an elevator car and in which the flat belt wraps part of the circumference of the belt-sheave, the flat belt having, in the area of a first belt running surface, at least one guide groove and the belt-sheave being provided with at least one guide rib projecting from its sheave running surface and extending in the direction of the circumference of the sheave running surface.

The advantages achieved by the invention are essentially to be seen in that the sideways-directed guiding forces that arise between the guide groove of the flat belt and the guide rib of the belt-sheave do not act on the flat belt in the edge area of the flat belt in the same manner as in the said belt guide with disk-shaped guide elements which act on the edge of the belt. In the solution according to the invention, the problem of the belt edge climbing onto the disk-shaped guide elements described above is eliminated. Furthermore, an increase in the maximum tractive force as a result of traction-increasing guide contours on the traction sheave and on the flat belt is avoided. In addition, secure guidance of the flat belt is achieved with simple and cost-saving means.

According to a preferred embodiment of the invention, the flat belt contains an essentially rectangular belt body of elastic material in which several tensile cords are embedded. By this means, the flat belt is given the necessary tensile strength. Optimal guidance of the flat belt on the belt-sheave is ensured by the cross section of the guide rib of the belt-sheave being essentially complementary to the cross section of the guide groove of the flat belt.

An undesired increase in the tractive force that can be transferred between a traction sheave and the flat belt is avoided in that, when the first belt running surface of the flat belt lies on the running surface of the sheave, and the guide rib engages in the guide groove, there is play (axial play $S_a$) between the guide rib and the guide groove in the direction of the axis of the belt-sheave.

It is expedient for the guide rib of the belt-sheave to be 0.1 mm to 2 mm narrower than the guide groove of the flat belt so that the axial play $S_a$ between the guide rib and the guide groove is 0.1 mm to 3 mm. This ensures firstly that the guide does not cause an increase in the tractive force, and secondly, that the possible lateral displacement of the flat belt on the belt-sheave is relatively little.

It has proven to be advantageous for the amount of axial play $S_a$ between the guide rib and the guide groove to be executed as depending on the width of the flat belt, the axial play $S_a$ being preferably 0.5% to 10% of the width of the flat belt.

To be certain of avoiding that the flat belt supports itself by the narrow area of the bottom surface of its guide groove on the guide rib of the belt-sheave, it is expedient for the depth of the guide groove and the height of the guide rib to be so adapted to each other that between the two, in radial direction, there is play (radial play $S_r$) when the first belt running surface of the flat belt lies on the sheave running surface of the belt-sheave.

According to especially preferred embodiments of the invention, the guide groove, as well as the guide rib that is formed complementary to it, has a cross section in the form of a trapezoid or a triangle or a segment of a circle. Guide grooves and guide ribs with this cross-sectional form can be easily and precisely made and are especially suitable for transferring lateral forces occurring between the flat belt and the belt-sheave.

A belt guide with adequate to very good guiding properties contains a guide groove and guide rib with trapezoidal or triangular cross section if the angle $\alpha$ between the flanks of the guide groove and of the guide rib respectively lies between 0° and 120°, preferably between 10° and 60°.

A belt guide perpendicular to the belt that is particularly strong and wear-resistant is obtained by the surface of at least one guide groove of the flat belt being provided with a fabric reinforcement and/or with a friction-reducing and/or wear-resistant layer.

An advantageous embodiment of the invention consists of there being added to the elastic material of the belt body of the flat belt an additive that reduces its coefficient of friction. By this means, the normally high coefficient of friction between the elastic material of the belt body and the sheave running surface of the belt-sheave is so reduced that the loading of the guide groove of the flat belt by the lateral forces needed for its guidance is reduced, which makes the guide functionally safer and less prone to wear. Suitable for reducing the said coefficient of friction are, for example, additives of polyethylene or cotton fibers.

When use is made of relatively wide flat belts, it can be advantageous to manufacture these with several parallel guide grooves and to provide the belt-sheave with several corresponding guide ribs. By this means, the lateral forces needed to guide the flat belt are distributed over several guide points, which in turn results in an increase in functional safety and wear resistance of the flat belt guide.

An expedient embodiment of the invention to assure the operating safety of the elevator consists of the elevator containing as suspension means several flat belts that are provided with guide grooves and arranged parallel to each other, and the belt-sheave having several sheave running surfaces arranged adjacent to each other, each of the sheave running surfaces being provided with at least one guide rib.

A minimal reduction of the strength of a flat belt executed according to the invention results from the arrangement of the tensile cords being so chosen that in the area of a guide groove these are spaced farther apart from each other than outside such an area. An even distribution of the tensile cords is departed from, so that as many of them as possible can be embedded in the belt body.

An embodiment of the invention that can be used with particular versatility consists of the flat belt having a guide rib projecting from a second (backside) belt running surface. This backside guide rib can interact with a guide groove in the sheave running surface of a belt deflector sheave around which the flat belt runs in such manner that it touches the belt deflector sheave with its second (backside) belt running surface. This embodiment makes it possible to realize arrangements of suspension means with guided flat belts in which the flat belts are guided over several belt-sheaves in such manner that they are thereby flexed in opposite directions.

Exemplary embodiments of the invention are explained below by reference to the attached drawings.

BRIEF DESCRIPTION OF THE DRAWINGS

Shown are in

DETAILED DESCRIPTION OF THE INVENTION

Figure 1:
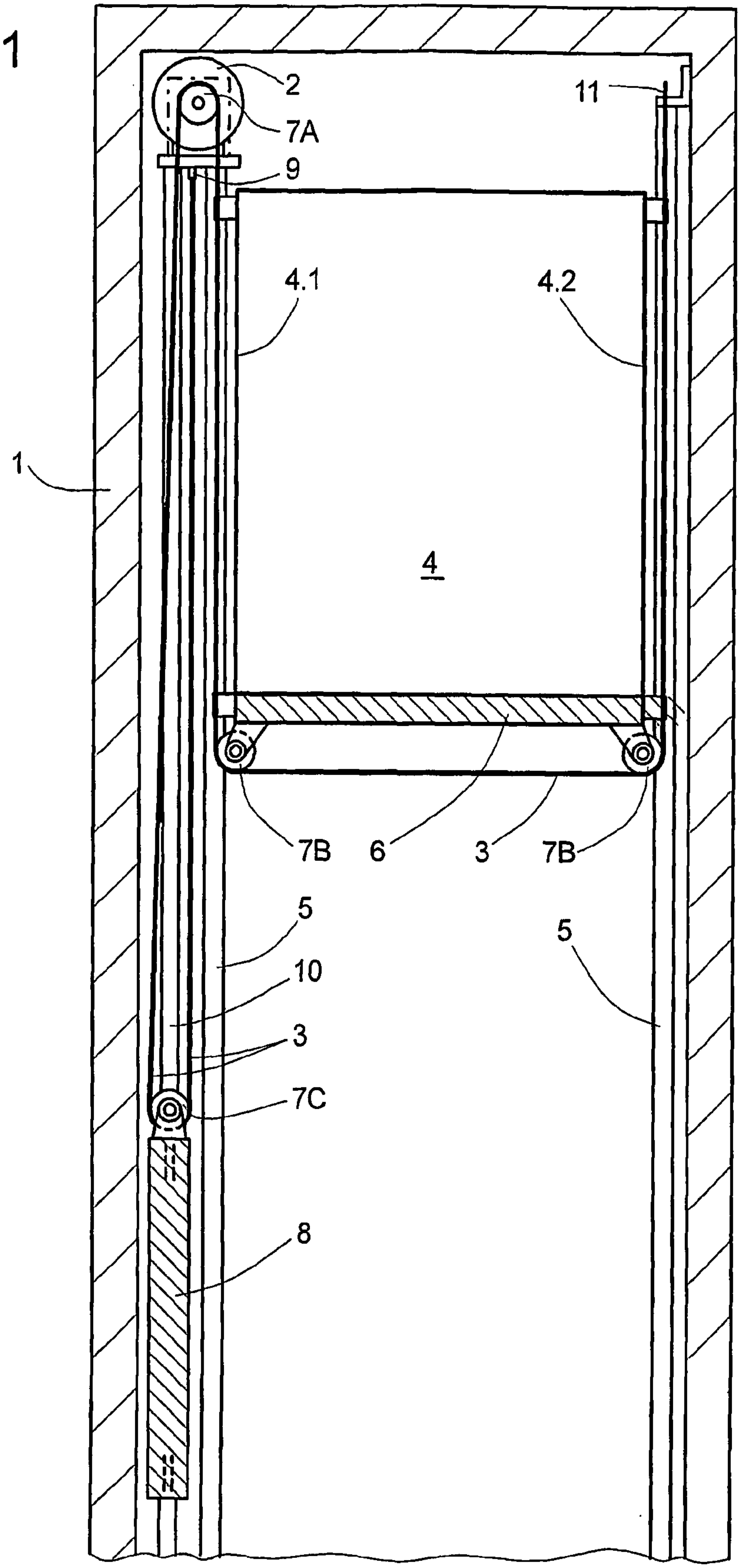
FIG. 1 a diagrammatic cross section through an elevator installation according to the invention.

FIG. 1 shows diagrammatically a cross section through an elevator according to the invention. Designated with reference number 1 is an elevator hoistway in which, via a suspension means in the form of a flat belt 3, a drive machine 2 with a drive belt-sheave 7A moves an elevator car 4 upwards and downwards. The drive machine 2 is arranged in the upper part of the elevator hoistway 1 and supported on a car guide rail 5 and two counterweight guide rails 10. The elevator car 4 is guided on car guide rails 5 fixed in the elevator hoistway 1. Mounted underneath the car floor 6 on both sides are car belt-sheaves 7B via which the suspension forces of flat belts 3 are transferred to the elevator car 4. Arranged on the left side of the elevator car 4 is a counterweight 8 which is guided on the counterweight guide rails 10 and, by means of a counterweight belt-sheave 7C, hung on the same flat belt 3 as the elevator car 4.

The plane of the drive belt-sheave 7A is arranged at right angles to the car wall 4.1 on the counterweight side and lies approximately in the middle of the car depth. The flat belt 3 serving as suspension means is fixed at one of its ends under the drive belt-sheave 7A. From this first suspension means fastening point 9 it extends downwards to the counterweight belt-sheave 7C, wraps around this, extends from there to the drive belt-sheave 7A, wraps around this, and then passes downwards along the car wall 4.1 on the counterweight side, wraps 90° respectively around each of the car belt-sheaves 7B mounted under the elevator car on both sides of the elevator car 4 and passes upwards along the car wall 4.2 facing away from the counterweight 8 to a second suspension means fastening point 11.

The described arrangement of suspension means causes in each case opposite vertical movements of the elevator car 4 and of the counterweight 8, their speed being half the circumferential speed of the drive belt-sheave 7A.

When wrapping around the counterweight belt-sheave 7C and around the drive belt-sheave 7A, the flat belt 3 undergoes flexure in a certain direction of flexure, whereas when wrapping around the car belt-sheaves 7B it is flexed in the opposite direction of flexure.

In the interest of simplicity, hereinafter no difference is made between drive, car, and counterweight belt-sheaves 7A, 7B, 7C, and only the designation 'belt-sheave 7' is used.

To ensure that the flat belt 3 serving as suspension means always runs correctly on the belt-sheave 7 with which it interacts, the flat belt 3 has at least one guide groove extending in its longitudinal direction, while the belt-sheave 7 is provided with guide ribs that engage in the at least one guide groove of the flat belt 3. Through the interaction of guide groove and guide ribs, the flat belt 3 is centered on the sheave running surfaces of the belt-sheaves 7, even if the belt-sheaves are not perfectly aligned with each other. The at least one guide groove of the flat belt, as well as the at least one guide rib of the belt-sheave, are described in detail below by reference to further drawings.

Figure 2:
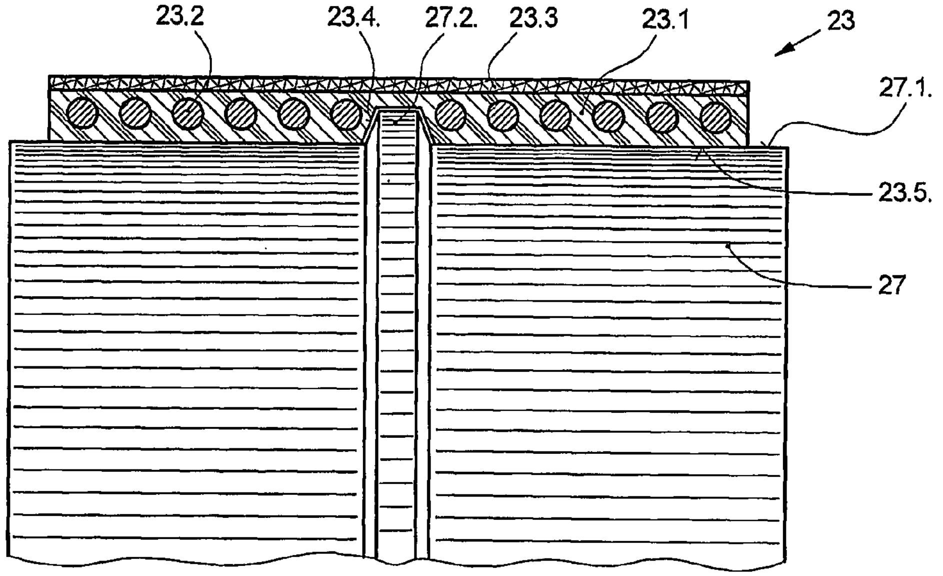
FIG. 2 a cross section through a flat belt with a guide groove lying on a belt-sheave with a guide rib.

FIG. 2 shows a flat belt 23 lying on a belt-sheave 27. The flat belt comprises a belt body 23.1 with a first belt running surface 23.5, a backside reinforcing layer 23.3, and several tensile cords 23.2 which are embedded in the belt body. The belt body 23.1 is made of an elastic and wear-resistant material, preferably of an elastic plastic as, for example, polyurethane (PU) or ethylene-propylene terpolymer (EPDM). To somewhat reduce the laterally directed guiding forces that must be absorbed by the mutually engaging guide ribs and guide grooves, an additive such as, for example, silicone, polyethylene, or cotton fibers can be added to the elastic material of the belt body 23.1 which reduces its coefficient of friction with respect to the belt-sheave. As tensile cords 23.2, use can be made of round or flat strands of fine steel wire or of high-tensile synthetic fibers as, for example, aramid fibers. The backside reinforcing layer 23.3 can be a textile of cotton or synthetic fibers, or a film, for example a polyamide film. It protects the belt body 23.1 against mechanical damage.

The belt-sheave 7, which in the elevator can have the function of a drive belt-sheave (traction sheave) or a deflection belt-sheave, is normally made of steel, gray cast iron, or spheroidal cast iron, but can also be made of a plastic as, for example, polyamide. In the interest of optimal utilization of the available hoistway space and a lowest possible required torque on the drive machine 2, the belt-sheaves can have diameters D of less than 100 mm. To ensure that during operation of the elevator the flat belt 23 is always guided on the running surface 27.1 of the belt-sheave 27, the belt-sheave 27 is provided with a guide rib 27.2 which engages in a guide groove 23.4 in the flat belt 23. In the arrangement shown in FIG. 2, the guide rib 27.2 of the belt-sheave 7, as well as the guide groove 23.4 of the flat belt 23, have trapezoidal cross sections that are essentially mutually complementary. Between the guide rib 27.2 and the guide groove 23.4, sufficient play in axial and radial direction is present to ensure that no V-belt effect occurs, so that when the belt-sheave is used as a traction sheave, the intended tractive force is not exceeded in any situation. This avoids the risk that, should a control or drive fault cause the elevator car or the counterweight to rest on their respective lower travel limits, the tractive force between the traction sheave and the flat belt remains so high that the elevator car or counterweight respectively is moved further upwards. On belt-sheaves acting as deflection sheaves, the play ensures that no V-belt effect occurs that causes vibrations to be excited in the flat belt.

A ‘V-belt effect’ is to be understood as gripping effects between a V-groove of a V-belt-sheave and a V-belt running in the V-groove. These gripping effects result firstly in an increase in the normal forces arising between the V-groove and the V-belt, and thus in the attainable tractive force. Secondly, they can excite oscillations in the free part of the V-belt where the V-belt runs out of the V-groove of the V-belt-sheave.

Figure 3:
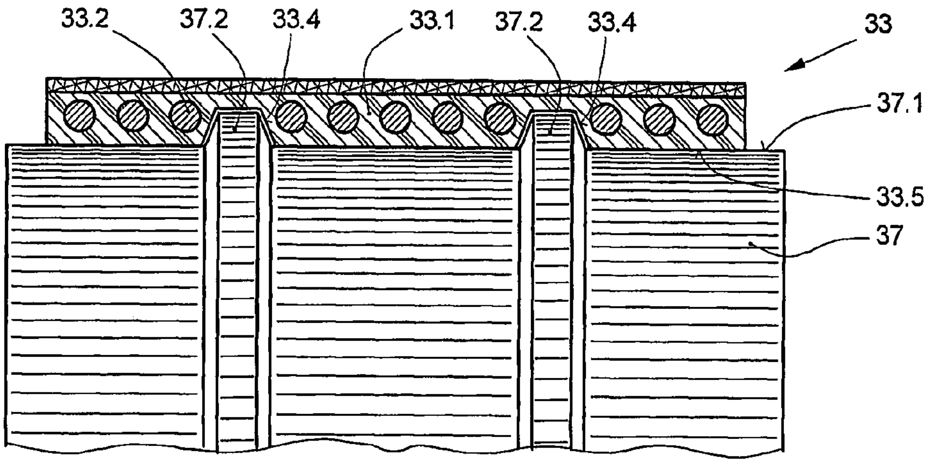
FIG. 3 a cross section through a flat belt with two guide grooves lying on a belt-sheave with two guide ribs.

FIG. 3 shows a flat belt 33 lying with its first belt running surface 33.5 on a belt-sheave 37. In contrast to the arrangement according to FIG. 2, here the flat belt 33 has two guide grooves 33.4, one of two guide ribs 37.2 of the belt-sheave 37 engaging in each of the guide grooves. The guiding force required to avoid lateral drifting away of the flat belt 33 is thus distributed over two flanks of the two guide grooves 33.4, which substantially increases the functional safety and wear resistance of the belt guide.

Figure 4:
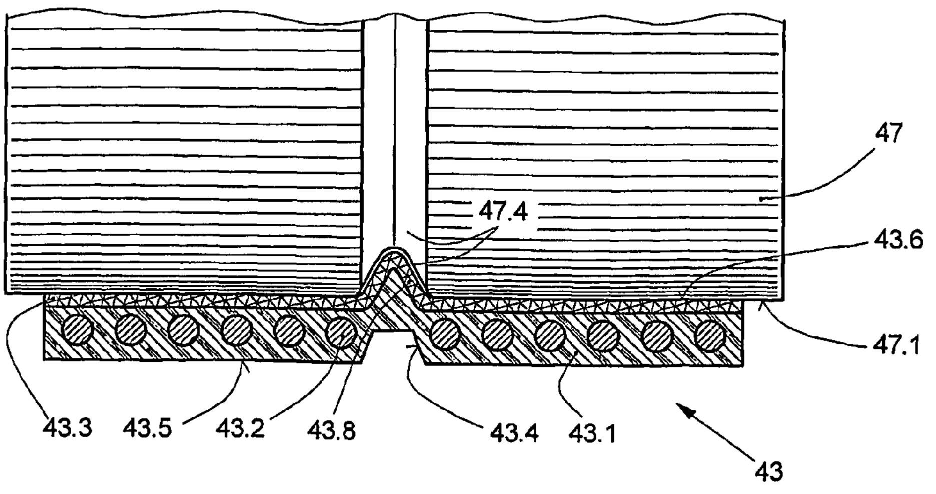
FIG. 4 a cross section through a flat belt with a backside guide rib lying on a belt deflection sheave.

FIG. 4 shows a flat belt 43 that wraps a belt-sheave 47—for example, the car belt-sheave 7B shown in FIG. 1—in such manner that it touches its sheave running surface 47.1 with its second belt running surface 43.6—also referred to as its belt backside. The flat belt 43 is—in addition to a guide groove 43.4 in its first belt running surface 43.5—provided with a backside guide rib 43.8 which projects from its second (backside) belt running surface 43.6 and which interacts with a sheave guide groove 47.4 that is present in the sheave running surface 47.1 of the belt-sheave 47. The backside reinforcement layer 43.3 can thus act as wear protection for the backside guide rib 43.8. Such a backside reinforcement layer is, however, not absolutely necessary. The embodiment shown in FIG. 4 allows realization of suspension means arrangements in elevator installations with guided flat belts in which the flat belts pass over several belt-sheaves which are arranged in such manner that, when doing so, the flat belts are flexed in mutually opposite directions.

From FIGS. 2, 3, and 4 it is apparent that the tensile cords 23.2; 33.2; 43.2 embedded in the belt body 23.1, 33.1, 43.1 in the areas of the guide grooves 23.4, 33.4, 47.4 are spaced at a greater distance from each other than outside such an area. This allows the flat belts to be equipped with as large a number as possible of tensile cords 23.2; 33.2; 43.2 arranged adjacent to each other so as to create flat belts with as high a permissible tensile load as possible.

FIGS. 5 to 8 show in enlarged views details of differently shaped and executed guide grooves of flat belts, and guide ribs of belt-sheaves with which they interact.

Figure 5:
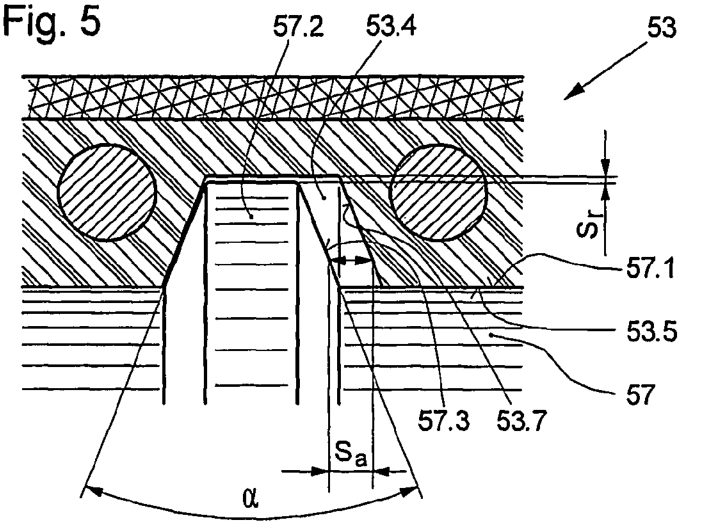
FIGS. 5-8 enlarged views of flat belts lying on belt-sheaves and having differently formed and executed guide grooves corresponding to the guide ribs of the corresponding belt-sheaves; and in FIG. 9 a belt-sheave with several sheave running surfaces on which several flat belts lie.

FIG. 5 shows enlarged a guide rib 57.2 of a belt-sheave 57 and the corresponding guide groove 53.4 of a flat belt 53, the execution and arrangement of these elements corresponding essentially to the corresponding elements in FIGS. 2 and 3. It is apparent that if the first belt running surface 53.5 of the flat belt lies on the sheave running surface 57.1, between the guide rib 57.2 and the guide groove 53.4 there is both axial play $S_a$ and radial play $S_r$ for the previously described purpose of avoiding an increase in traction being caused by a V-belt effect. To ensure a perfect guiding effect, it is advantageous for the amount of axial play $S_a$ measured in the direction of the belt-sheave axis to be 0.1 mm to 3 mm or 0.5% to 10% of the width of the flat belt. To optimize the tangential run-on of the flat belt 53 onto the belt-sheave 57 and the guide rib 57.2—especially in the case of deviations of the direction of the longitudinal axis of the belt from the direction of the tangent to the belt-sheave—the flanks 57.3 of the guide rib 57.2 are preferably inclined to each other so that in the case of a guide groove or guide rib with trapezoidal or triangular (FIG. 7) cross section, the angle α between the flanks of the guide groove and of the guide rib respectively lies in the range of 0° to 120°, preferably between 10° and 60°.

Figure 6:
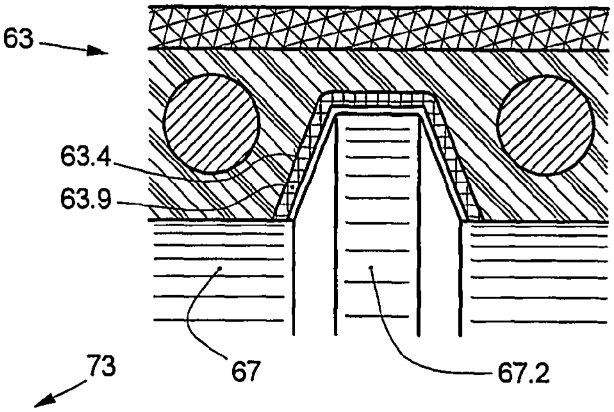

FIG. 6 also shows a guide rib 67.2 of a belt-sheave 67 and a corresponding guide groove 63.4 of the flat belt 63 which have trapezoidal cross-sections, the surface of the guide groove 63.4 of the flat belt being provided with a friction- and/or wear-reducing protective layer 63.9. The protective layer 63.9 can be present in the form of, for example, a fabric reinforcement or a plastic film.

Figure 7:
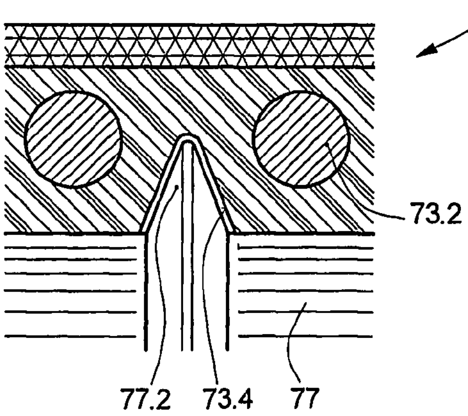

FIG. 7 shows an advantageous embodiment of a belt guide acting between a flat belt 73 and a belt-sheave 77. This is characterized in that the belt-sheave 77 has a triangular guide rib 77.2 which engages with a triangular guide groove 73.4 of the flat belt 73. In the direction of the width of the flat belt, this belt guide occupies little space and therefore allows the largest possible number of tensile cords 73.2 to be embedded adjacent to each other in the belt body.

Figure 8:
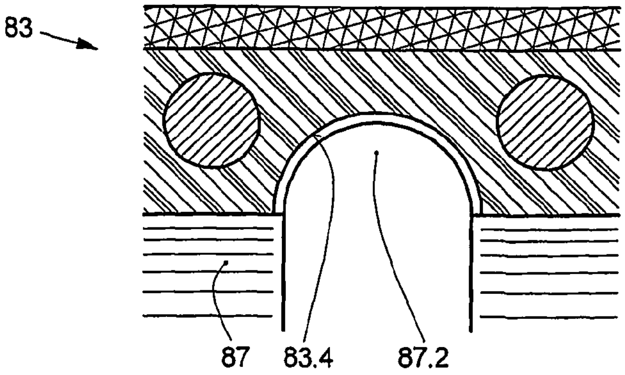

FIG. 8 shows a further possible embodiment of a belt guide acting between a belt-sheave 87 and a flat belt 83 in which at least one guide groove 83.4 is present in the flat belt 83 and at least one guide rib 87.2 is present in the belt-sheave 87 having respectively cross sections in the shape of a segment of a circle.

Figure 9:
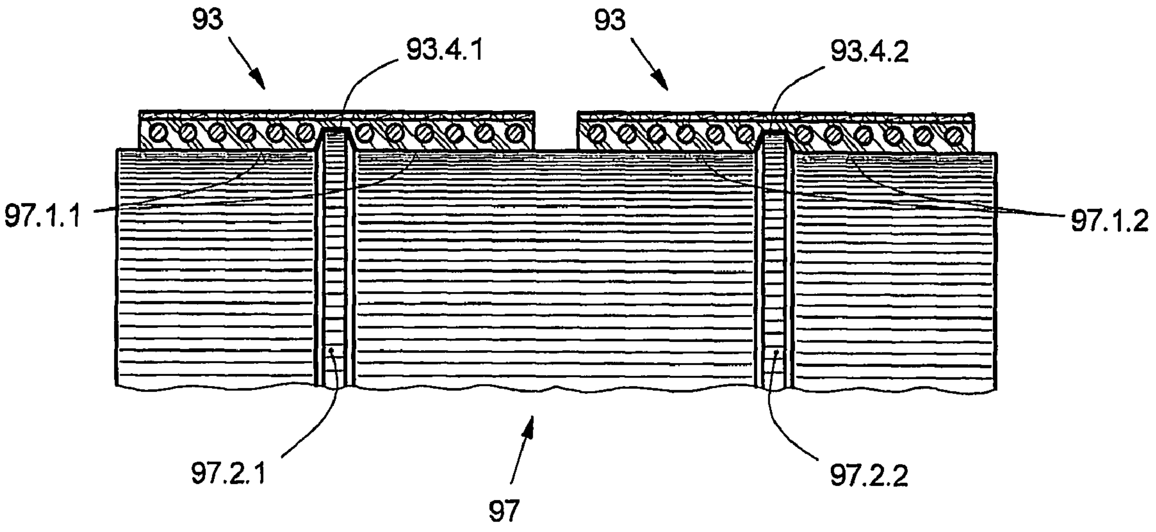

FIG. 9 shows a belt-sheave 97 on which lie two flat belts 93 that are arranged parallel to each other and have guide grooves 93.4.1 and 93.4.2. The belt-sheave 97 has two sheave running surfaces 97.1.1, 97.1.2 arranged adjacent to each other, each of which is provided with a guide rib 97.2.1, 97.2.2.

It is also possible for more than two flat belts to be arranged on each such belt-sheave, and for each of the flat belts to have more than one guide groove, and for each sheave running surface to have more than one guide rib.

Self-evidently, the previously made statements regarding the number of guide ribs and corresponding guide grooves, regarding the play $S_a$ and the play $S_r$ between guide ribs and guide grooves, as well as regarding the use of a backside guide rib, are applicable to all of the embodiments of the guide ribs and guide grooves that are shown. This also applies to the use of a protective layer for the reduction of friction and wear on the surface of guide grooves of the flat belt, as well as to the use of a backside reinforcement layer in the area of the second belt running surface.

The invention claimed is:

1. An elevator, comprising:

an elevator car;

at least one belt sheave having a sheave running surface; and at least one flat belt for suspending and moving the elevator car, the flat belt wrapping a part of the circumference of the belt-sheave, the flat belt having, in an area of a first belt running surface, at least one guide groove, the belt-sheave being provided with at least one guide rib which projects from the sheave running surface and extends in a circumferential direction of the sheave running surface, the guide rib being narrower than the guide groove;

wherein when the first belt running surface of the flat belt lies on the sheave running surface and the guide rib engages in the guide groove, the guide rib being narrower than the guide groove producing a gap between a flank of the guide rib and a flank of the guide groove opposing the flank of the guide rib, the gap between the flanks being substantially equal along the length of the flanks, the gap permitting axial play $S_a$ between the guide rib and the guide groove in the direction of the axis of the guide sheave, the amount of axial play $S_a$ between the guide rib and the guide groove is 0.1 mm to 3 mm, and the axial play $S_a$ preventing both opposing flanks of the guide rib and the guide groove from being in contact simultaneously.

2. The elevator according to claim 1, wherein the guide groove and the guide rib have a cross section formed as one of a trapezoid, a triangle or a segment of a circle.

3. The elevator according to claim 2, wherein when the guide groove or guide rib has a trapezoidal or triangular cross section, an angle a between flanks of the guide groove or of the guide rib respectively lies in a range between 0° and 120°.

4. The elevator according to claim 3, wherein the angle a lies in a range between 10° and 60°.

5. The elevator according to claim 1, wherein the flat belt has a rectangular belt body with a rectangular cross section of elastic material, and a number of tensile cords embedded in the belt body so as to extend in a longitudinal direction of the flat belt.

6. The elevator according to claim 5, wherein the elastic material of the belt body of the flat belt includes a coefficient of friction reducing additive.

7. The elevator according to claim 5, wherein the tensile cords are arranged in the belt body so that in an area of a guide groove the cords are at a greater distance from each other than outside such an area.

8. The elevator according to claim 1, wherein the guide rib of the belt-sheave has a cross section constructed to be complementary to the cross section of the guide groove of the flat belt.

9. The elevator according to claim 1, wherein the amount of axial play $S_a$ between the guide rib and the guide groove is 0.5% to 10% of the width of the flat belt.

10. The elevator according to claim 1, wherein play is present between the guide rib and the guide groove in a radial direction of the belt-sheave when the first belt running surface of the flat belt lies on the sheave running surface.

11. The elevator according to claim 1, wherein the at least one guide groove of the flat belt has a surface provided with a friction- and/or wear-reducing protective layer.

12. The elevator according to claim 1, wherein the flat belt has several parallel guide grooves and the belt-sheave has several corresponding guide ribs.

13. The elevator according to claim 1, comprising a plurality of flat belts arranged in parallel and provided with guide grooves, the belt-sheave having a plurality of sheave running surfaces arranged adjacent to each other, each of the sheave running surfaces being provided with at least one guide rib.

14. The elevator according to claim 1, further comprising:

a belt deflection sheave having a running surface with a guide groove therein, the flat belt having a backside guide rib projecting from a second belt running surface so as to interact with the guide groove in the sheave running surface of the belt deflection sheave around which the flat belt passes so that the belt touches the deflection sheave with the second belt running surface.

* * * * *